(12) United States Patent
Ward et al.

(10) Patent No.: US 12,469,214 B2
(45) Date of Patent: Nov. 11, 2025

(54) DISPLAYING OBJECTS ON A REAL-WORLD STRUCTURE

(71) Applicant: Sphere Entertainment Group, LLC, New York, NY (US)

(72) Inventors: Liam McClellan Ward, Burbank, CA (US); Tanner Luke Thompson, Fort Wayne, IN (US); Robert Ashely Wagers, Los Angeles, CA (US)

(73) Assignee: Sphere Entertainment Group, LLC, New York, NY (US)

( * ) Notice: Subject to any disclaimer, the term of this patent is extended or adjusted under 35 U.S.C. 154(b) by 93 days.

(21) Appl. No.: 18/341,464

(22) Filed: Jun. 26, 2023

(65) Prior Publication Data

US 2024/0428511 A1    Dec. 26, 2024

(51) Int. Cl.
*G06T 3/08* (2024.01)
*G02B 13/06* (2006.01)
*G03B 21/56* (2006.01)
*G06T 17/00* (2006.01)
*H04N 9/31* (2006.01)

(52) U.S. Cl.
CPC .............. *G06T 17/00* (2013.01); *G02B 13/06* (2013.01); *G03B 21/56* (2013.01); *G06T 3/08* (2024.01); *H04N 9/31* (2013.01)

(58) Field of Classification Search
None
See application file for complete search history.

(56) References Cited

U.S. PATENT DOCUMENTS

2019/0043219 A1*  2/2019  Tezaur .................. G06T 7/80
2024/0348766 A1* 10/2024  Wu ....................... G02B 13/06

OTHER PUBLICATIONS

Liu et al., "Spherical crown diffraction model by occlusion utilizing for a curved holographic display", Aug. 2022, Optics Express, vol. 30, p. 1-14, https://opg.optica.org/directpdfaccess/86bf92d9-6934-4ca6-b328e6a0c18f4a03_492028/oe-30-18-31685.pdf?da=1&id=492028&seq=0&mobile=no (Year: 2022).*

International Search Report and Written Opinion directed to related International Application No. PCT/US2024/035457, mailed Sep. 3, 2024; 12 pages.

(Continued)

*Primary Examiner* — Joni Hsu
(74) *Attorney, Agent, or Firm* — Sterne, Kessler, Goldstein & Fox P.L.L.C.

(57) ABSTRACT

Systems, methods, and apparatuses disclosed herein can process a three-dimensional model of an object in a three-dimensional space to display the object on a real-world structure. These systems, methods, and apparatuses can access the three-dimensional model of the object, generate a three-dimensional reflection model of the object, and/or provide the three-dimensional reflection model of the object to the real-world structure to display the object on the real-world structure. Alternatively, or additionally, these systems, methods, and apparatuses can transform the three-dimensional reflection model of the object onto a two-dimensional reflection model of the object and/or provide the two-dimensional reflection model of the object to the real-world structure to display the object on the real-world structure.

22 Claims, 6 Drawing Sheets

(56) References Cited

OTHER PUBLICATIONS

Benko et al., "Sphere: Multi-Touch Interactions on a Spherical Display," Proceedings of the 21st Annual ACM Symposium on User Interface Software and Technology, UIST'08, Oct. 19-22, 2008. Monterey, California, USA, ACM Press, New York, New York, USA, Oct. 19, 2008 (Oct. 19, 2008), pp. 77-86, XP058231337, DOI: 10.1145/1449715.1449729 ISBN: 978-1-59593-975-3 abstract sections: "Sensing and projection Distortions", "Data Coordinate Systems", figures 6, 7; 10 pages.

Vega et al., "Visualization on Spherical Displays: Challenges and Opportunities," Nov. 9, 2014; 9 pages.

Anonymous: "Snow Globe: Part One, Cheap DIY spherical Projection | eclecticc", Sep. 25, 2011 (Sep. 25, 2011), XP093197278, Retrieved from the Internet: URL:https://web.archive.org/web/20110925104108/https://eclecti.cc/computergraphics/s now-globe-part-one-cheap-diy-spherical-projection, the whole document; 3 pages.

\* cited by examiner

DISPLAYING OBJECTS ON A REAL-WORLD STRUCTURE

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to audiences seated within venues for their viewing pleasure. Content creators have been projecting images onto buildings, such as these venues, with specialized video projection equipment. There are different types of projections that content creators can use to create building projections. One of these referred to as guerrilla projections which projects still or moving images from specialized mobile video projection equipment onto buildings without permission. Another one of these is commonly known as projection mapping, also referred to as video mapping, that represents a form of lighting design and technology in which the specialized mobile video projection equipment projects and/or skews images to fit the contours of buildings.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can process a three-dimensional model of an object in a three-dimensional space to display the object on a real-world structure. These systems, methods, and apparatuses can access the three-dimensional model of the object, generate a three-dimensional reflection model of the object, and/or provide the three-dimensional reflection model of the object to the real-world structure to display the object on the real-world structure. Alternatively, or additionally, these systems, methods, and apparatuses can transform the three-dimensional reflection model of the object onto a two-dimensional reflection model of the object and/or provide the two-dimensional reflection model of the object to the real-world structure to display the object on the real-world structure.

Figure 1:
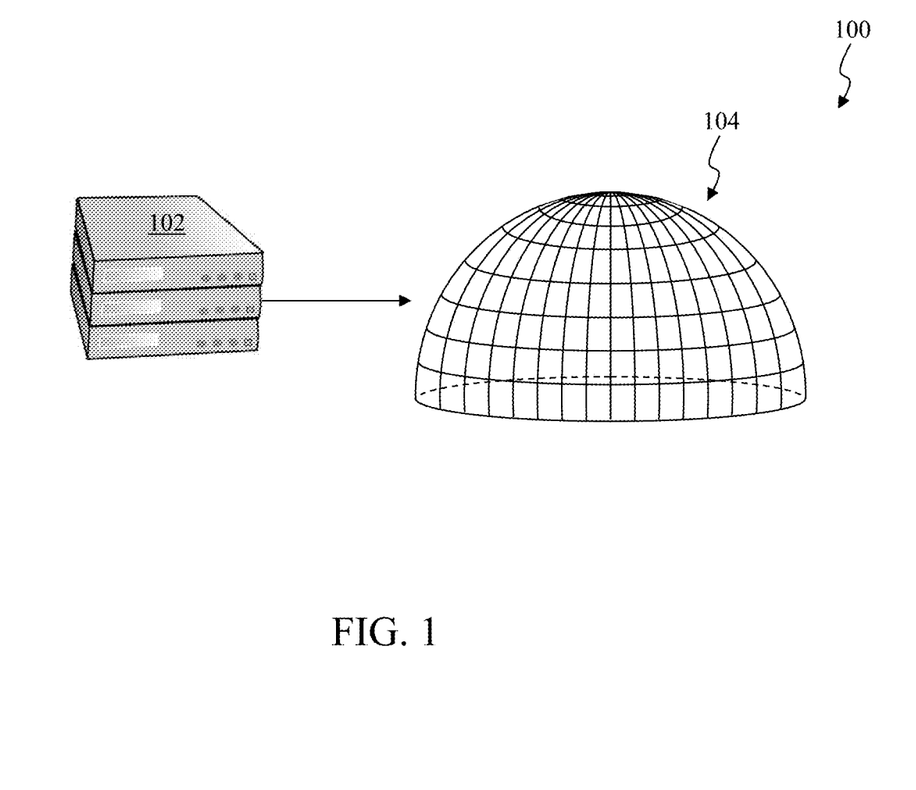
FIG. 1 illustrates a simplified block diagram of an exemplary model processing system according to some exemplary embodiments of the present disclosure.

Exemplary Model Processing System for Displaying Three-Dimensional Models on a Real-World Structure FIG. 1 illustrates a simplified block diagram of an exemplary model processing system according to some exemplary embodiments of the present disclosure. In the exemplary embodiment illustrated in FIG. 1, a model processing system 100 can process a three-dimensional model of an object in a three-dimensional space to display the object on a real-world structure. In some embodiments, the object can include a simple object, such as a cube, a prism, a pyramid, a sphere, a cone, a cylinder, among others to provide some examples; however, more complicated objects, such as a beach, a building, a forest, a highway, an industry, a mountain, among others are possible as will be recognized by those skilled in the relevant art(s) without departing from the spirit and scope of the present disclosure. As to be described in further detail below, the model processing system 100 can generate a three-dimensional in the three-dimensional space reflection model of the object from the three-dimensional model of the object. In some embodiments, the three-dimensional reflection model of the object, also referred to as an inside-out model of the object, represents one or more reflected duplications of the three-dimensional model of the object along one or more reflective surfaces in the three-dimensional space. And as to be described in further detail below, it can be advantageous for the model processing system 100 to transform the three-dimensional reflection model of the object from the three-dimensional space onto a two-dimensional space to provide a two-dimensional reflection model of the object. In some embodiments, the model processing system 100 can display the three-dimensional reflection model of the object and/or the two-dimensional reflection model of the object on the real-world structure to display the object on the real-world structure. As illustrated in FIG. 1, the model processing system 100 can include a model processing server 102 and a real-world structure 104. Although the discussion to follow can describe the real-world structure 104 as performing certain actions, it should be appreciated that such descriptions are merely for convenience and that such actions in fact result from the operation of one or more mechanical, electrical, and/or electro-mechanical devices included within the real-world structure 104 as will be recognized by those skilled in the relevant art(s) without departing from the spirit and scope of the present disclosure.

The model processing server 102 includes one or more computer systems, an exemplary embodiment of which is to be described in further detail below, that can process the three-dimensional model of the object in the three-dimensional space to display the object on the real-world structure 104. In some embodiments, the model processing server 102 can access the three-dimensional model of the object in the three-dimensional space. In some embodiments, the three-dimensional model of the object can be implemented as a shell, or a boundary, model in the three-dimensional space; however, a solid model in the three-dimensional space is possible as will be recognized by those skilled in the relevant art(s) without departing from the spirit and scope of the present disclosure. In some embodiments, the three-dimensional model of the object can represent a collection of points having three-dimensional coordinates in the three-dimensional space that are interconnected by various geometric entities, such as triangles, lines, curved surfaces, among others to provide some examples, to approximate one or more surfaces of the object. In some embodiments, the three-dimensional model of the object can include coloring, texture mapping, shading, lighting, among others to provide some examples to further define the one or more surfaces of the object.

After accessing the three-dimensional model of the object, the model processing server 102 can generate the three-dimensional reflection model of the object in the three-dimensional space from the three-dimensional model of the object. As described above, the three-dimensional reflection model of the object, also referred to as the inside-out model of the object, represents one or more reflected duplications of the three-dimensional model of the object along one or more reflective surfaces in the three-dimensional space. In some embodiments, the three-dimensional reflection model of the object can appear almost identical to the three-dimensional model of the object in the three-dimensional space but can be reversed in some directions that are normal to the one or more reflective surfaces in the three-dimensional space. And, after generating the three-dimensional reflection model of the object, the model processing server 102 can provide the three-dimensional reflection model of the object to the real-world structure space to display the object on the real-world structure 104.

Alternatively, or additionally, the model processing server 102 can transform the three-dimensional reflection model of the object from the three-dimensional space onto a two-dimensional space to provide a two-dimensional reflection model of the object. In some embodiments, the model processing server 102 can mathematically transform the three-dimensional reflection model of the object from the three-dimensional space onto the two-dimensional space in accordance with a mathematical projection function, such as an equirectangular projection function, an equidistant fisheye projection function, an equisolid fisheye projection function, a stereographic fisheye projection function, an equiangular cubemap projection function, a latitude/longitude projection function, and/or any other suitable mathematical projection function that will be apparent to those skilled in the relevant art(s) without departing from the spirit and scope of the present disclosure. In some embodiments, the mathematical projection function to be realized by the model processing server 102 to transform the three-dimensional reflection model of the object can be based on the construction of the real-world structure 104 to generate a more realistic, aesthetically pleasing display of the two-dimensional reflection model of the object on the real-world structure 104 and, at the same time, reduce rendering errors and/or artifacts. As an example, the model processing server 102 can realize the equirectangular projection function to transform the three-dimensional reflection model of the object based on the real-world structure 104 being a hemisphere structure, also referred to as a hemispherical dome. And in this alternate, or addition, the model processing server 102 can provide the two-dimensional reflection model of the object to the real-world structure 104 space to display the object on the real-world structure 104.

The real-world structure 104 represents a building and/or a non-building structure that receives the three-dimensional reflection model of the object and/or the two-dimensional reflection model of the object from the model processing server 102. Generally, the building structure refers to any suitable structure or structures that are designed for human occupancy and can include one or more residential, industrial, and/or commercial building structures to provide some examples. For example, the real-world structure 104 can be implemented as the hemisphere structure, also referred to as the hemispherical dome, as described above that hosts an event, such as a musical event, a theatrical event, a sporting event, a motion picture, and/or any other suitable event that will be apparent to those skilled in the relevant art(s) without departing the spirit and scope of the present disclosure. And the non-building structure refers to any suitable structure or structures that are not designed for human occupancy and can include one or more residential, industrial, and/or commercial non-building structures to provide some examples. In some embodiments, the real-world structure 104 can include one or more visual displays that are spread across an exterior, or an outer shell, of the real-world structure 104. For example, the real-world structure 104 can include approximately 55,700 square meters of programmable light-emitting diode (LED) light panels that create the appearance of a giant screen that are spread across the exterior, or the outer shell, of the real-world structure 104. In these embodiments, the one or more visual displays can include rows and columns of programmable picture elements, also referred to as pixels, in three-dimensions that form one or more programmable picture element light panels to display the three-dimensional reflection model of the object and/or the two-dimensional reflection model of the object. In these embodiments, the pixels can be implemented using one or more light-emitting diode (LED) displays, one or more organic light-emitting diode (OLED) displays, and/or one or more quantum dots (QDs) displays to provide some examples. In some embodiments, the real-world structure 104 can map the three-dimensional reflection model of the object and/or the two-dimensional reflection model of the object onto the pixels across the exterior, or the outer shell, to display the object across the exterior, or the outer shell.

Figure 2A:
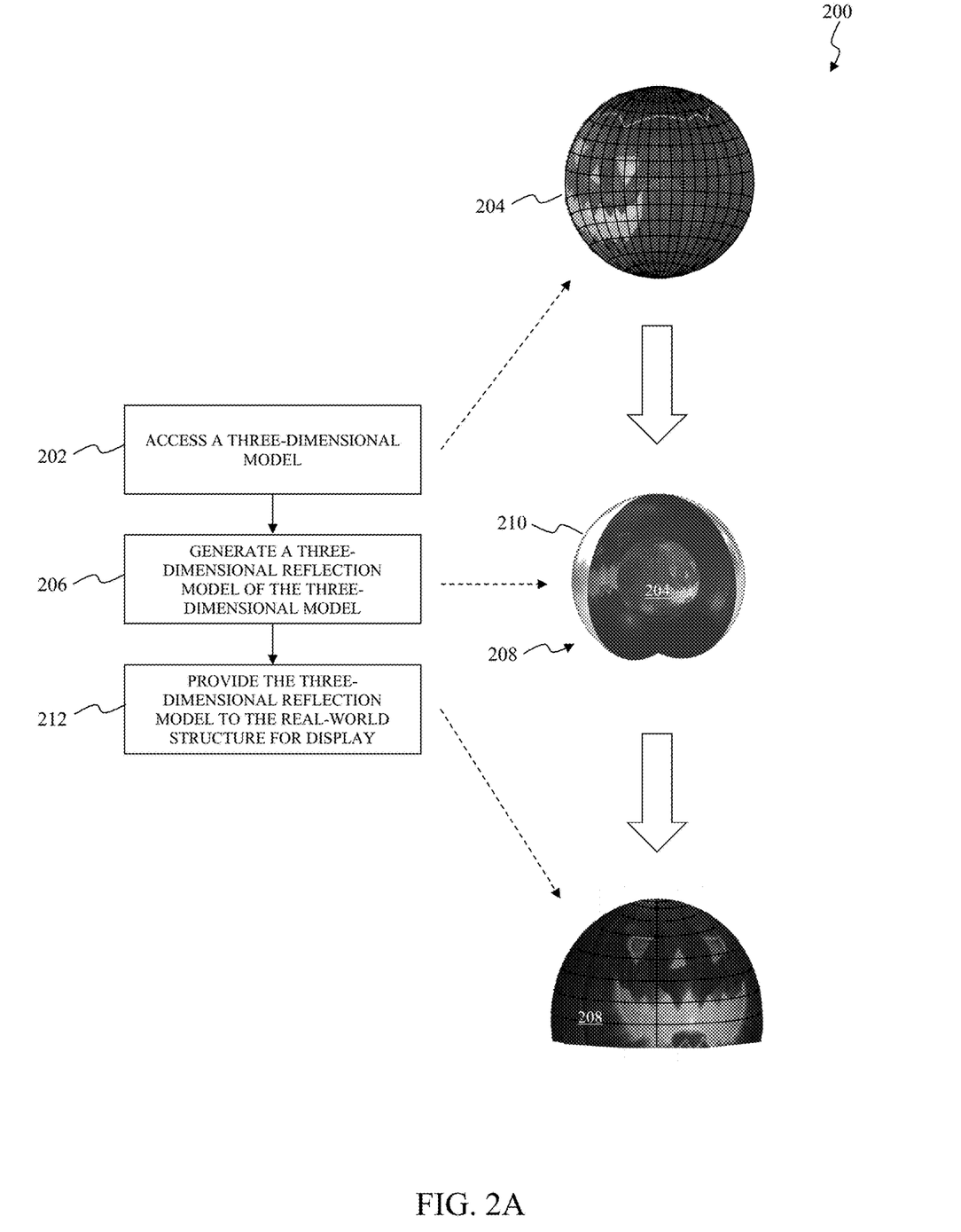
FIG. 2A and FIG. 2B graphically illustrate exemplary operational control flows that can be implemented within the exemplary model processing system to display an exemplary object on a real-world structure in accordance with some exemplary embodiments of the present disclosure.
Figure 2B:
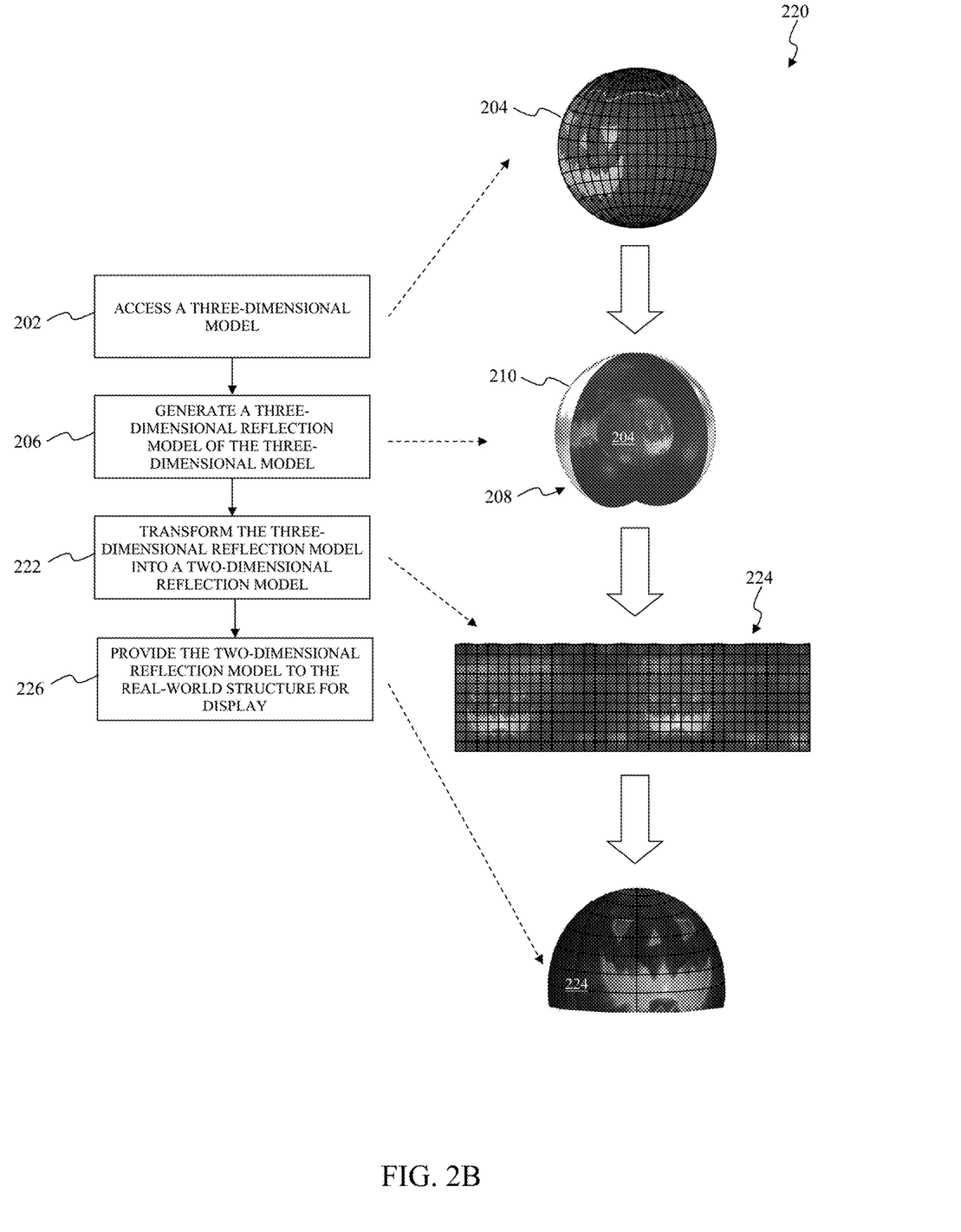

Exemplary Operational Control Flows to Display an Exemplary Object on a Real-World Structure FIG. 2A and FIG. 2B graphically illustrate exemplary operational control flows that can be implemented within the exemplary model processing system to display an exemplary object on a real-world structure in accordance with some exemplary embodiments of the present disclosure. The following discussion is to describe exemplary operational control flows 200 and 220 for processing a three-dimensional model of an object, such as a pumpkin to provide an example, in a three-dimensional space to display the object on a real-world structure, such as the real-world structure 104 as described above. The present disclosure is not limited to these exemplary operational control flows. Rather, it will be apparent to ordinary persons skilled in the relevant art(s) that other operational control flows are within the scope and spirit of the present disclosure. Although the operational control flows 200 and 220 can be described in further detail below in relation to a three-dimensional model of the pumpkin, this is for exemplary purposes only and not intended to be limiting. Those skilled in the relevant art(s) will recognize that the operational control flows 200 and 220 as to be described in further detail below can process other three-dimensional models of other objects in a substantially similar manner as to be described in further detail below in FIG. 2A and FIG. 2B to display these objects on the real-world structure without departing from the spirit and scope of the present disclosure. These other objects can include a simple object, such as a cube, a prism, a pyramid, a sphere, a cone, a cylinder, among others to provide some examples; however, more complicated objects, such as a beach, a building, a forest, a highway, an industry, a mountain, among others are possible as will be recognized by those skilled in the relevant art(s) without departing from the spirit and scope of the present disclosure. Moreover, the operational control flows 200 and 220 as to be described in further detail below in FIG. 2A and FIG. 2B represent one or more modeling tools, that when executed by one or more computer systems such as the model processing server 102 as described above, can process the three-dimensional model of the object in the three-dimensional space to display the object on the real-world structure. In some embodiments, the one or more modeling tools can represent one or more software tools, for example, three-dimensional modeling, animating, simulating, and/or rendering software tools, that can be executed by the model processing server 102 to access the three-dimensional model of the object, generate a three-dimensional reflection model of the object, and/or provide the three-dimensional reflection model of the object to the real-world structure to display the object on the real-world structure as to be described in further detail below in FIG. 2A. In these embodiments, the one or more modeling tools can alternatively, or additionally, transform the three-dimensional reflection model of the object onto a two-dimensional reflection model of the object and/or provide the two-dimensional reflection model of the object to the real-world structure to display the object on the real-world structure as to be described in further detail below in FIG. 2B.

Referring to FIG. 2A, the operational control flow 200 can access the three-dimensional model of the object, for example, the three-dimensional model of the pumpkin 204, at operation 202. In some embodiments, the operational control flow 200 can receive the three-dimensional model of the object in the three-dimensional space. In these embodiments, the one or more computer systems can be communicatively coupled to one or more machine-readable mediums, such as read only memory (ROM), random access memory (RAM), magnetic disk storage media, optical storage media, flash memory devices, a hard disk drive, for example, a solid-state drive, a floppy disk drive and associated removable media, a CD-ROM drive, an optical drive, a flash memory, removable media cartridges, among others to provide some examples, that store the three-dimensional model of the object. In these embodiments, the operational control flow 200 can receive the three-dimensional model of the object from the one or more machine-readable mediums. Alternatively, or in addition to, the operational control flow 200 can build the three-dimensional model of the object, for example, manually, algorithmically, and/or by scanning to provide some examples. In some embodiments, the operational control flow 200 can build the three-dimensional model of the object in the the-dimensional space using the one or more software tools. In these embodiments, the one or more software tools can build the three-dimensional model of the object through parametric modeling, polygonal modeling, and/or digital sculpting to provide some examples. In some embodiments, the operational control flow 200 can scan one or more reference materials of the object, such as one or more images of the object and/or one or more videos of the object to provide some examples, to build the three-dimensional model of the object. In some embodiments, the operational control flow 200 can stitch together multiple images of the object, for example, multiple photographs of the object to build the three-dimensional model of the object, often referred to as photogrammetry.

At operation 206, the operational control flow 200 can generate the three-dimensional reflection model of the object from operation 202 in the three-dimensional space, for example, the three-dimensional reflection model of the object of the pumpkin 208 as illustrated in FIG. 2A. As described above, the three-dimensional reflection model of the object, also referred to as an inside-out model of the object, represents one or more reflected duplications of the three-dimensional model of the object from operation 202 along one or more reflective surfaces in the three-dimensional space. In some embodiments, the operational control flow 200 can position the three-dimensional model of the object from operation 202, for example, the three-dimensional model of the pumpkin 204, within a three-dimensional reflecting volume 210 having one or more reflective surfaces. In some embodiments, the three-dimensional reflecting volume 210 can include a cube, a prism, a pyramid, a sphere, a cone, a cylinder, among others to provide some examples. For convenience, a cutaway drawing, or diagram, of the three-dimensional reflecting volume 210 having some of the one or more reflective surfaces removed to expose the three-dimensional model of the pumpkin 204 is illustrated in FIG. 2A. In some embodiments, the one or more reflective surfaces can be characterized as being perfectly reflective surfaces; however, less than perfectly reflective surfaces are possible as will be recognized by those skilled in the relevant art(s) without departing from the spirit and scope of the present disclosure. As illustrated in FIG. 2A, the three-dimensional reflecting volume 210 can encompass, for example, be greater in volume than, the three-dimensional model of the object from operation 202 to enclose the three-dimensional model of the object from operation 202 within the one or more reflective surfaces of three-dimensional reflecting volume 210 in the three-dimensional space. As to be described in further detail below, the three-dimensional reflecting volume 210 can reflect the three-dimensional model of the object, for example, the three-dimensional model of the pumpkin 204, onto the one or more reflective surfaces in the three-dimensional space. In some embodiments, the operational control flow 200 can capture the three-dimensional model of the object, for example, the three-dimensional model of the pumpkin 204, that is reflected onto the one or more reflective surfaces to construct the three-dimensional reflection model of the object from the three-dimensional model of the object from operation 202 in the three-dimensional space.

At operation 212, the operational control flow 200 can provide the three-dimensional reflection model of the object from operation 206 in the three-dimensional space for example, the three-dimensional reflection model of the object of the pumpkin 208, to the real-world structure to display the object on the real-world structure. In some embodiments, the operational control flow 200 can store the three-dimensional reflection model of the object from operation 206 in any suitable well-known image file format, such as Joint Photographic Experts Group (JPEG) image file format, Exchangeable Image File Format (EXIF), Tagged Image File Format (TIFF), Graphics Interchange Format (GIF), bitmap image file (BMP) format, or Portable Network Graphics (PNG) image file format to provide some examples, that will be apparent to those skilled in the relevant art(s) without departing from the spirit and scope of the present disclosure. In these embodiments, the operational control flow 200 can provide the three-dimensional reflection model of the object from operation 206 in the three-dimensional space in the suitable well-known image file format to the real-world structure to display the object on the real-world structure.

Referring to FIG. 2B, the operational control flow 220 can access the three-dimensional model of the object, as described above, in the three-dimensional space, for example, the three-dimensional model of the pumpkin 204 at operation 202 as described above. And as illustrated ion FIG. 2B, the operational control flow 220 can generate the three-dimensional reflection model of the object from operation 202 in the three-dimensional space, for example, the three-dimensional reflection model of the object of the pumpkin 208 as described above.

At operation 222, the operational control flow 220 can transform the three-dimensional reflection model of the object from operation 206 from the three-dimensional space to provide a two-dimensional reflection model of the object in a two-dimensional space, for example, a two-dimensional reflection model of the object of the pumpkin 224 in the two-dimensional space. In some embodiments, the operational control flow 220 can mathematically transform one or more three-dimensional coordinates $(pos.x_1, pos.y_1, pos.z_1)$, $(pos.x_2, pos.y_2, pos.z_2)$, ... $(pos.x_n, pos.y_n, pos.z_n)$, collectively referred to as three-dimensional coordinates pos.x, pos.y, and pos.z, of the three-dimensional reflection model of the object from operation 206 in the three-dimensional space onto one or more two-dimensional coordinates $(uv.x_1, uv.y_1)$, $(uv.x_2, uv.y_2)$, ... $(uv.x_n, uv.y_n)$, collectively referred to as two-dimensional coordinates uv.x, uv.y, of the two-dimensional reflection model of the object in the two-dimensional space. In these embodiments, the operational control flow 220 can project the three-dimensional coordinates pos.x, pos.y, and pos.z of the three-dimensional reflection model of the object from operation 206 onto the two-dimensional coordinates uv.x, uv.y, of the two-dimensional reflection model of the object in the two-dimensional space in accordance with a mathematical projection function, such as an equirectangular projection function, an equidistant fisheye projection function, an equisolid fisheye projection function, a stereographic fisheye projection function, an equiangular cubemap projection function, a latitude/longitude projection function, and/or any other suitable mathematical projection function that will be apparent to those skilled in the relevant art(s) without departing from the spirit and scope of the present disclosure.

At operation 226, the operational control flow 200 can provide the two-dimensional reflection model of the object from operation 222 in the two-dimensional space, for example, the two-dimensional reflection model of the object of the pumpkin 224, to the real-world structure to display the object on the real-world structure. In some embodiments, the operational control flow 200 can store the two-dimensional reflection model of the object from operation 222 in any suitable well-known image file format, such as Joint Photographic Experts Group (JPEG) image file format, Exchangeable Image File Format (EXIF), Tagged Image File Format (TIFF), Graphics Interchange Format (GIF), bitmap image file (BMP) format, or Portable Network Graphics (PNG) image file format to provide some examples, that will be apparent to those skilled in the relevant art(s) without departing from the spirit and scope of the present disclosure. In these embodiments, the operational control flow 200 can provide the two-dimensional reflection model of the object from operation 222 in the two-dimensional space in the suitable well-known image file format to the real-world structure to display the object on the real-world structure.

Figure 3:
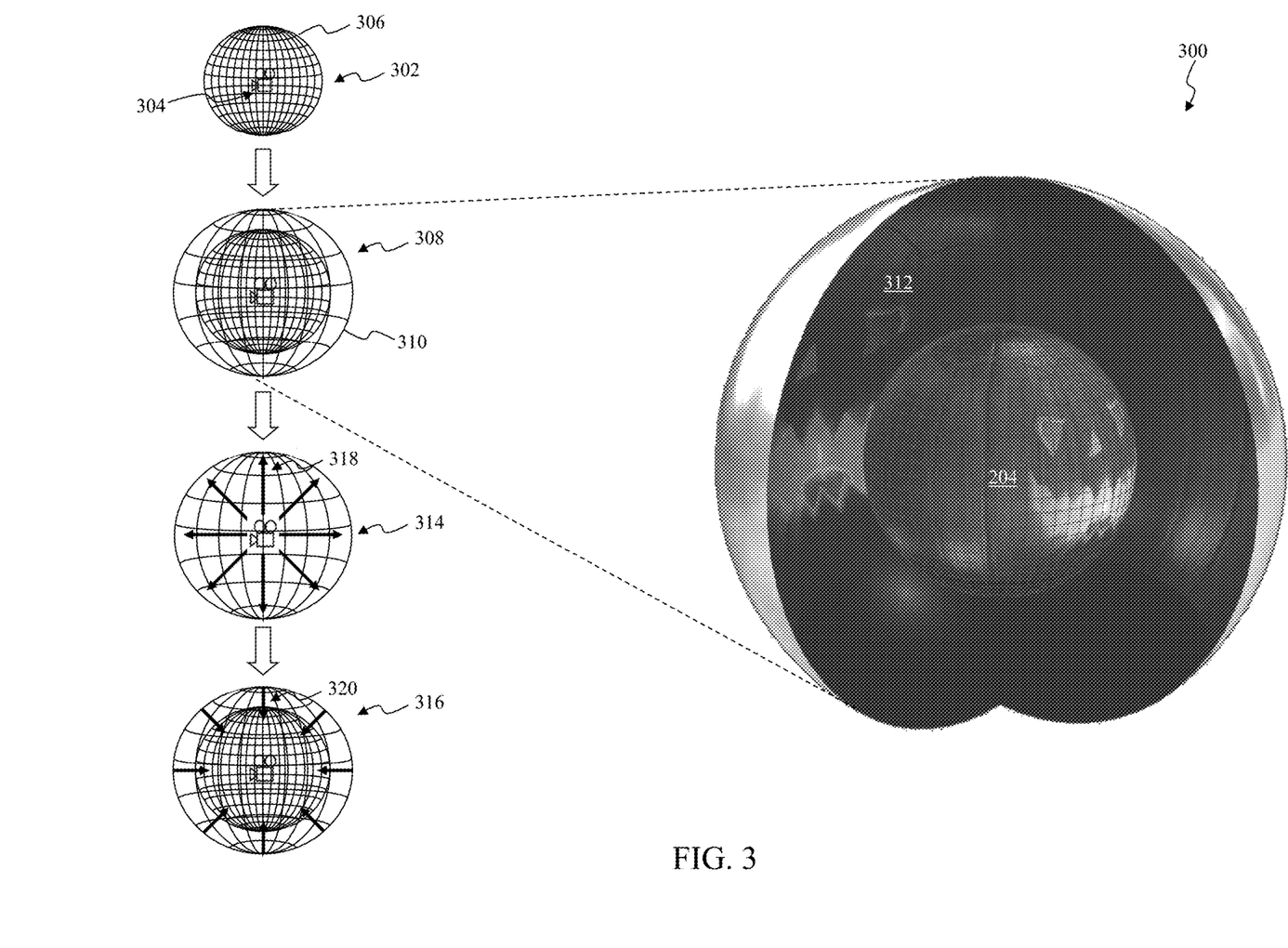
FIG. 3 graphically illustrates an exemplary operational control flow that can be implemented within the exemplary model processing system to generate a three-dimensional reflection model of the exemplary object in accordance with some exemplary embodiments of the present disclosure.

Exemplary Operational Control Flows to Generate a Three-Dimensional Reflection Model of the Exemplary Object FIG. 3 graphically illustrates an exemplary operational control flow that can be implemented within the exemplary model processing system to generate a three-dimensional reflection model of the exemplary object in accordance with some exemplary embodiments of the present disclosure. The present disclosure is not limited to this exemplary operational control flow. Rather, it will be apparent to ordinary persons skilled in the relevant art(s) that other operational control flows are within the scope and spirit of the present disclosure. The following discussion is to describe an exemplary operational control flow 300 to generate a three-dimensional reflection model of an object. As described above, the three-dimensional reflection model of the object, also referred to as an inside-out model of the object, represents one or more reflected duplications of a three-dimensional model of the object along one or more reflective surfaces in the three-dimensional space. In some embodiments, the object can include a simple object, such as a cube, a prism, a pyramid, a sphere, a cone, a cylinder, among others to provide some examples; however, more complicated objects, such as a beach, a building, a forest, a highway, an industry, a mountain, among others are possible as will be recognized by those skilled in the relevant art(s) without departing from the spirit and scope of the present disclosure. In some embodiments, the object can include, for example, the pumpkin as described above. Although the operational control flow 300 can be described in further detail below in relation to a three-dimensional model of the pumpkin, this is for exemplary purposes only and not intended to be limiting. Moreover, the operational control flow 300 as to be described in further detail below in FIG. 3 represents one or more modeling tools, that when executed by one or more computer systems such as the model processing server 102 as described above, can generate the three-dimensional reflection model of the object in the three-dimensional space as to be described in further detail below. In some embodiments, the operational control flow 300 can be an exemplary embodiment of the operation 206 as described above.

As operation 302, the operational control flow 300 can position a virtual camera 304 within a three-dimensional model of the object 306, for example, the three-dimensional model of the pumpkin 204 as described above, and/or a three-dimensional reflecting volume 310, for example, the three-dimensional reflecting volume 210 as described above. The three-dimensional reflecting volume 310 is to be described in further detail below. In some embodiments, the operational control flow 300 can position the virtual camera 304 within the center of the three-dimensional model of the object 306 in the three-dimensional space. Alternatively, or in addition to, the operational control flow 300 can position the virtual camera 304 within the center of the three-dimensional reflecting volume 310 in the three-dimensional space. In these embodiments, the center of the three-dimensional model of the object 306 and/or the center of the three-dimensional reflecting volume 310 can, for example, define a central focal point, such an origin point of the three-dimensional model of the object 306, in the three-dimensional space for the operational control flow 300 to generate the three-dimensional reflection model of the object as to be described in further detail below. In these embodiments, the central focal point can define an initial point or a starting point to generate the three-dimensional reflection model of the object in the three-dimensional space. In some embodiments, the virtual camera 304 can be implemented as an omnidirectional camera, also referred to as 360-degree camera, having a three-hundred sixty (360) degree spherical field of view to cover approximately a sphere or at least a circle in any plane of the sphere.

At operation 308, the operational control flow 300 cause the three-dimensional model of the object 306, for example, the three-dimensional model of the pumpkin 204, to be reflected onto a three-dimensional reflecting volume 310 in the three-dimensional space. In some embodiments, the three-dimensional reflecting volume 310 can include a cube, a prism, a pyramid, a sphere, a cone, a cylinder, among others to provide some examples. In some embodiments, the operational control flow 300 can position the virtual camera 304 and the three-dimensional model of the object 306 within the three-dimensional reflecting volume 310 having one or more reflective surfaces 312. For convenience, a cutaway drawing, or diagram, of the three-dimensional reflecting volume 310 having some of the one or more reflective surfaces 312 removed to expose the three-dimensional model of the object 306, for example, the three-dimensional model of the pumpkin 204 as described above. In some embodiments, the one or more reflective surfaces 312 can be characterized as being perfectly reflective surfaces; however, less than perfectly reflective surfaces are possible as will be recognized by those skilled in the relevant art(s) without departing from the spirit and scope of the present disclosure. As illustrated in FIG. 3, the three-dimensional reflecting volume 310 can encompass, for example, be greater in volume than, the three-dimensional model of the object 306 to enclose the three-dimensional model of the object 306 within the one or more reflective surfaces 312 in the three-dimensional space. As illustrated in the cutaway drawing, or diagram, of the three-dimensional reflecting volume 310, the operational control flow 300 can position the one or more reflective surfaces 312 to reflect the three-dimensional model of the object 306 onto the one or more reflective surfaces 312. In some embodiments, the three-dimensional reflecting volume 310 can represent a shell, or a boundary, model in the three-dimensional space having the one or more reflective surfaces 312 on one or more interior surfaces of the three-dimensional reflecting volume 310 to reflect the three-dimensional model of the object 306.

At operations 314 and 316, the operational control flow 300 can capture the three-dimensional model of the object 306, for example, the three-dimensional model of the pumpkin 204, that is reflected onto the one or reflective surfaces 312 to construct the three-dimensional reflection model of the object in the three-dimensional space. At operation 314, the virtual camera 304 can radially distribute one or more virtual rays of light 318 in the three-dimensional space toward the one or more reflective surfaces 312. In some embodiments, the one or more virtual rays of light 318 can emanate from the central focal point from operation 302 toward the one or more reflective surfaces 312 in the three-dimensional space. In some embodiments, the virtual camera 304 can radially distribute the one or more virtual rays of light 318 from the central focal point to traverse three-hundred sixty (360) degrees in the three-dimensional space, for example, to traverse a sphere in the three-dimensional space or at least a circle in any plane of the sphere in the three-dimensional space. In some embodiments, the operational control flow 300 can cause the three-dimensional model of the object 306 to be transparent to the one or more virtual rays of light 318. In these embodiments, the three-dimensional model of the object 306 can be completely, or almost completely, transparent to the one or more virtual rays of light 318 effectively causing the three-dimensional model of the object 306 to be invisible to, or ignored by, the one or more virtual rays of light 318. At operation 318, the virtual camera 304 can capture one or more virtual reflected rays of light 320 in the three-dimensional space that are reflected by the one or more reflective surfaces 312. In some embodiments, the one or more virtual rays of light 318 can be reflected by the one or more reflective surfaces 312 to generate the one or more virtual reflected rays of light 320. In some embodiments, the one or more virtual reflected rays of light 320 pass through the three-dimensional model of the object 306, for example, the three-dimensional model of the pumpkin 204 as described above. In these embodiments, the one or more virtual reflected rays of light 320 pass through the three-dimensional model of the object 306 at one or more three-dimensional coordinates in the three-dimensional space, for example, x, y, and z coordinates of the Cartesian coordinate system. In some embodiments, the one or more virtual reflected rays of light 320 can capturing color information of the three-dimensional model of the object 306 at the one or more three-dimensional coordinates in the three-dimensional space as the one or more virtual reflected rays of light 320 pass through the three-dimensional model of the object 306. In these embodiments, the color information can include luminance and/or chrominance color components of a YUV color model at the one or more three-dimensional coordinates and/or red, green, and/or blue color components of a RGB color model at the one or more three-dimensional coordinates. In some embodiments, the virtual camera 304 can capture the one or more virtual reflected rays of light 320 after the one or more virtual reflected rays of light 320 have passed through the three-dimensional model of the object 306. In these embodiments, the operational control flow 300 can construct the three-dimensional reflection model of the object from the one or more three-dimensional coordinates in the three-dimensional space and/or the color information of the three-dimensional model of the object 306 at the one or more three-dimensional coordinates as captured by the virtual camera 304. In some embodiments, the operational control flow 300 can construct the three-dimensional reflection model of the object as a shell, or a boundary, model in the three-dimensional space; however, a solid model in the three-dimensional space is possible as will be recognized by those skilled in the relevant art(s) without departing from the spirit and scope of the present disclosure.

Figure 4A:
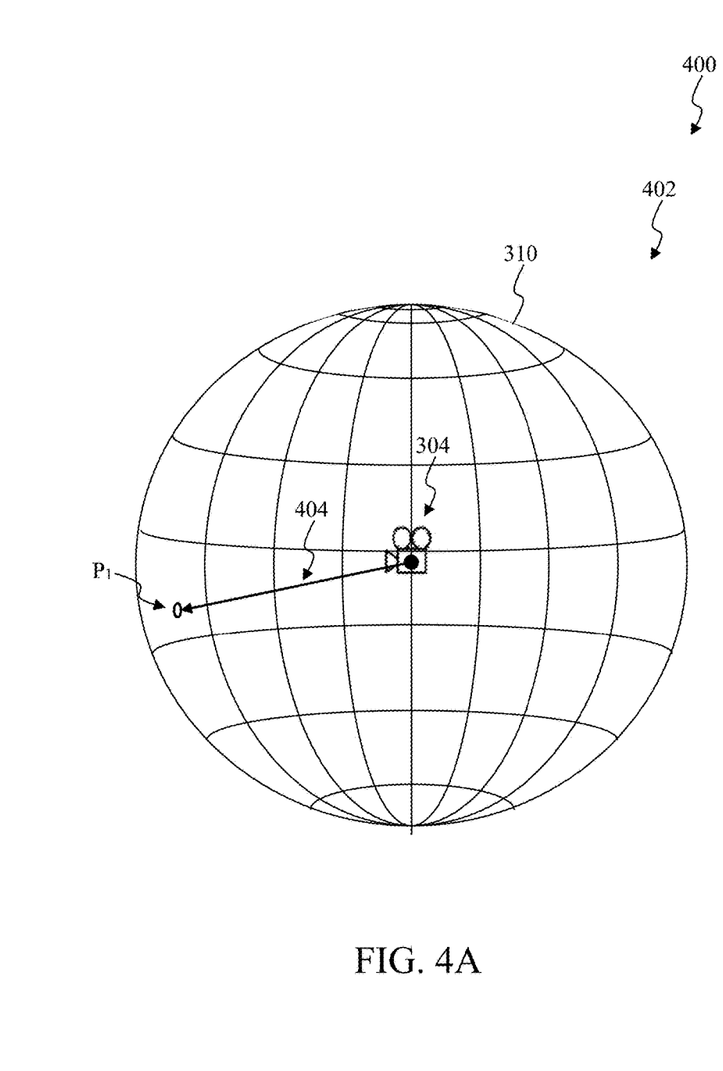
FIG. 4A and FIG. 4B graphically illustrate an exemplary operational control flow that can be implemented within the exemplary model processing system to capture the three-dimensional reflection model of the exemplary object in accordance with some exemplary embodiments of the present disclosure.
Figure 4B:
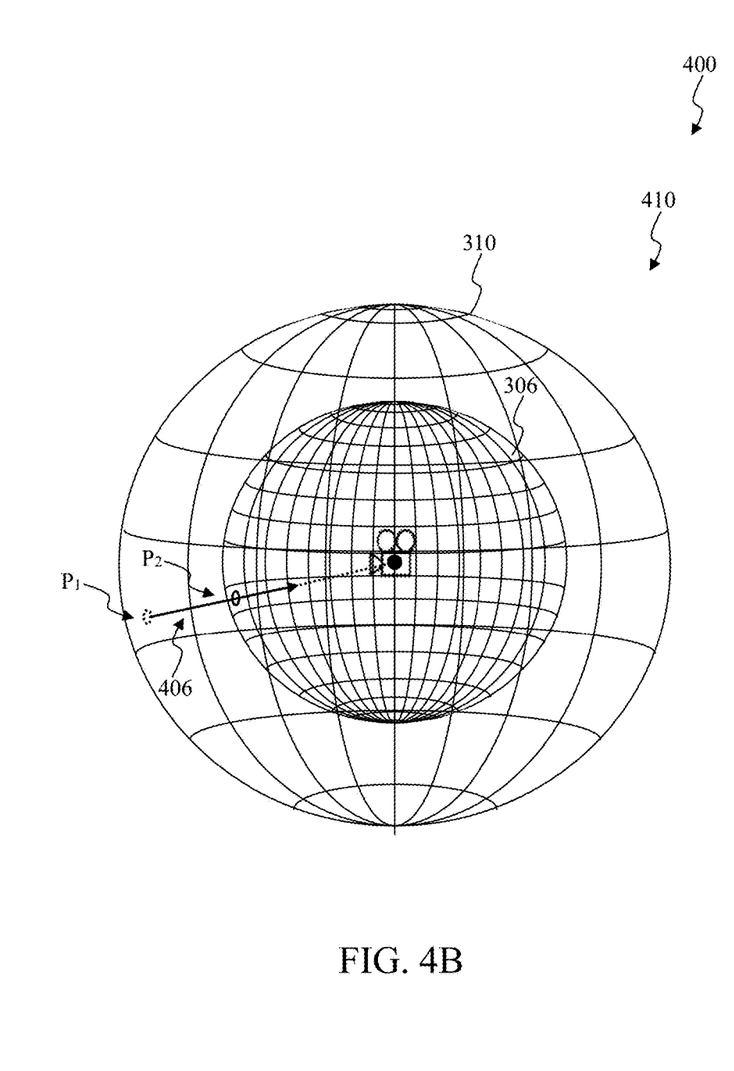

FIG. 4A and FIG. 4B graphically illustrate an exemplary operational control flow that can be implemented within the exemplary model processing system to capture the three-dimensional reflection model of the exemplary object in accordance with some exemplary embodiments of the present disclosure. The present disclosure is not limited to this exemplary operational control flow. Rather, it will be apparent to ordinary persons skilled in the relevant art(s) that other operational control flows are within the scope and spirit of the present disclosure. The following discussion is to describe an exemplary operational control flow 400 to radially distribute one or more virtual rays of light in the three-dimensional space toward a three-dimensional reflecting volume and/or to capture one or more virtual reflected rays of light in the three-dimensional space that are reflected by the three-dimensional reflecting volume. Moreover, the operational control flow 400 represents one or more modeling tools, that when executed by one or more computer systems such as the model processing server 102 as described above, can radially distribute the one or more virtual rays of light and/or can capture the one or more virtual reflected rays of light to be described in further detail below. In some embodiments, the exemplary operational control flow 400 can represent exemplary embodiments of the operations 314 and 316 as described above.

At operation 402, the operational control flow 400 can radially distribute one or more virtual rays of light in the three-dimensional space toward the three-dimensional reflecting volume 310. In some embodiments, the operational control flow 400 can position the virtual camera 304 within the three-dimensional reflecting volume 310 having the one or more reflective surfaces 312 in a substantially similar manner as described above. As illustrated in FIG. 4, the virtual camera 304 can radially distribute a virtual ray of light 404, for example, one of the one or more virtual rays of light 318 as described above, in the three-dimensional space toward the one or more reflective surfaces 312 of the three-dimensional reflecting volume 310. In some embodiments, the virtual ray of light 404 can emanate from the central focal point, denoted as a solid dot in FIG. 4A and FIG. 4B, along a light pathway, for example, a straight-line pathway, toward the one or more reflective surfaces 312 of the three-dimensional reflecting volume 310 in the three-dimensional space. As illustrated in FIG. 4A, the virtual ray of light 404 can intersect with the one or more reflective surfaces 312 of the three-dimensional reflecting volume 310. In some embodiments, the virtual ray of light 404 can intersect with the one or more reflective surfaces 312 of the three-dimensional reflecting volume 310 at a first three-dimensional point $P_1$ on the three-dimensional reflecting volume 310 in the three-dimensional space. In these embodiments, the first three-dimensional point $P_1$ can have spherical coordinates of $(r_1, \theta, \varphi)$ in the three-dimensional space to provide an example. In some embodiments, the operational control flow 400 can cause the three-dimensional model of the object 306 that is illustrated in FIG. 4B to be transparent to the one or more virtual rays of light 318 as illustrated in FIG. 4A. In these embodiments, the three-dimensional model of the object 306 can be completely, or almost completely, transparent to the virtual ray of light 404 effectively causing the three-dimensional model of the object 306 to be invisible to, or ignored by, the virtual ray of light 404.

At operation 410, the operational control flow 400 can capture the three-dimensional model of the object 306 that is reflected onto the three-dimensional reflecting volume 310 in the three-dimensional space. As illustrated in FIG. 4B, the one or more reflective surfaces 312 of the three-dimensional reflecting volume 310 can reflect the virtual ray of light 404 to provide a virtual reflected ray of light 406, for example, one of the one or more virtual reflected rays of light 320 as described above. In some embodiments, the virtual reflected ray of light 406 reflects from the one or more reflective surfaces 312 of the three-dimensional reflecting volume 310 toward the central focal point. In these embodiments, the virtual reflected ray of light 406 reflects from the first three-dimensional point $P_i$ on the three-dimensional reflecting volume 310 following the same light pathway, for example, the same straight-line pathway as described above, as the virtual ray of light 404 toward the central focal point as illustrated in FIG. 4A. In some embodiments, the virtual reflected ray of light 406 can intersect with the three-dimensional model of the object 306 at a second three-dimensional point $P_2$ on the three-dimensional model of the object 306 in the three-dimensional space. In these embodiments, the second three-dimensional point $P_2$ can have spherical coordinates of $(r_2, \theta, \varphi)$ in the three-dimensional space with the second radius $r_2$ of the second three-dimensional point $P_2$ being less than the first radius $r_1$ of the first three-dimensional point $P_1$ to provide an example. In some embodiments, the virtual ray of light 404 and/or the virtual reflected ray of light 406 can be implemented as white light having a combination of one or more colors in the color spectrum. In these embodiments, the three-dimensional model of the object 306 can absorb some of colors in the color spectrum while allowing other colors in the color spectrum to pass through. In these embodiments, the virtual reflected ray of light 406 having these other colors can pass through the three-dimensional model of the object 306 onto the central focal point to be captured by the virtual camera 304. In some embodiments, the virtual camera 304 can capture color information of the three-dimensional model of the object 306 at the second three-dimensional point $P_2$ from the virtual reflected ray of light 406. In these embodiments, the color information can include luminance and/or chrominance color components of a YUV color model at the one or more three-dimensional coordinates and/or red, green, and/or blue color components of a RGB color model at the one or more three-dimensional coordinates.

In some embodiments, the operational control flow 400 can associate the color information of the three-dimensional model of the object 306 captured at the second three-dimensional point $P_2$ and the coordinates of the second three-dimensional point $P_2$, for example, the spherical coordinates of $(r_2, \theta, \varphi)$. In these embodiments, the operational control flow 400 can store the color information of the three-dimensional model of the object 306 captured at the second three-dimensional point $P_2$ as an organized collection of data, often referred to as a database. The database may include one or more data tables having data values, such as alphanumeric strings, integers, decimals, floating points, dates, times, binary values, Boolean values, and/or enumerations to provide some examples. The database can be a columnar database, a relational database, a key-store database, a graph database, and/or a document store to provide some examples.

Figure 5:
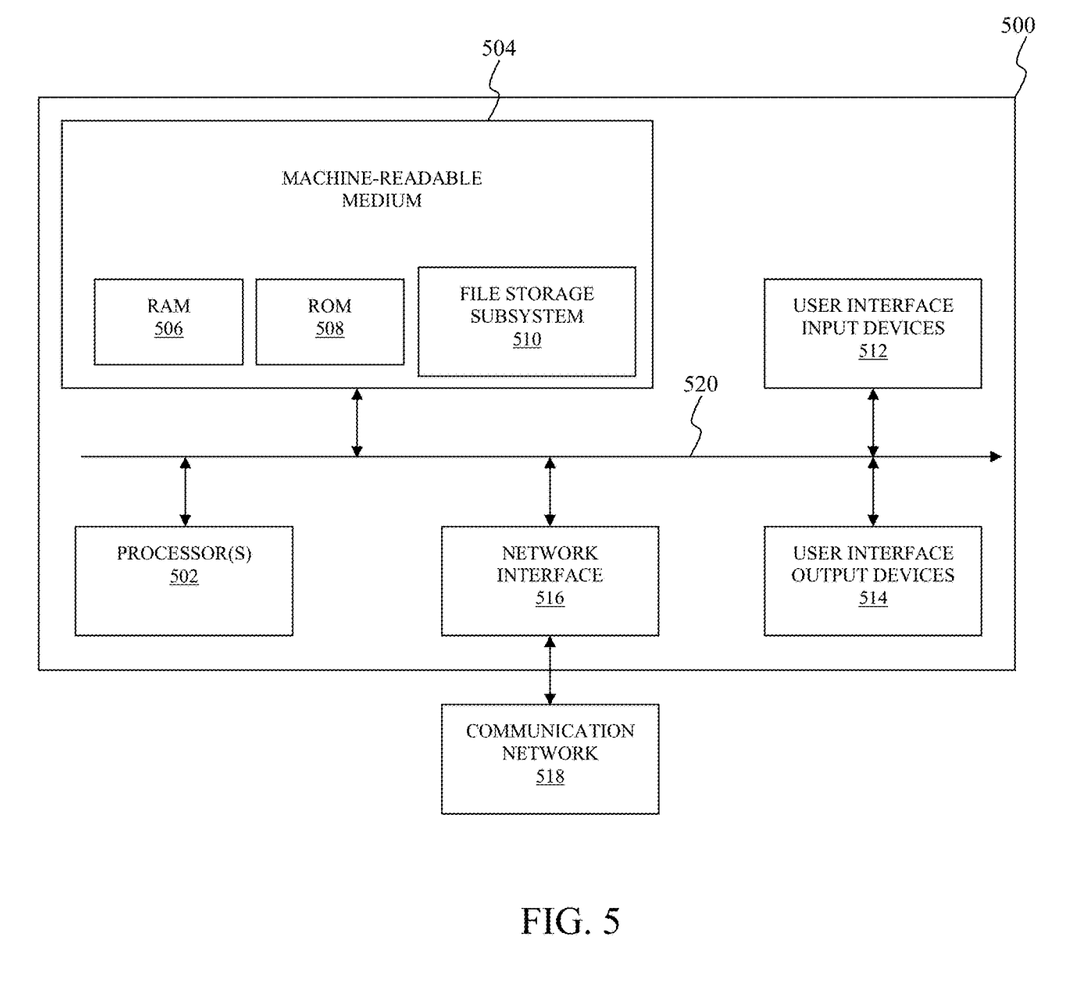
FIG. 5 illustrates a simplified block diagram of an exemplary computer system that can be implemented within the exemplary model processing system according to some exemplary embodiments of the present disclosure.

Exemplary Computer System that can be Implemented within the Exemplary Model Processing System FIG. 5 illustrates a simplified block diagram of an exemplary computer system that can be implemented within the exemplary model processing system according to some exemplary embodiments of the present disclosure. The discussion of FIG. 5 to follow is to describe a computer system 500 that used to implement the model processing server 102 and/or the one or more mechanical, electrical, and/or electro-mechanical devices included within the real-world structure 104 as described above.

In the exemplary embodiment illustrated in FIG. 5, the computer system 500 includes one or more processors 502.

In some embodiments, the one or more processors 502 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 500 can include an operating system, such as Microsoft's Windows, Sun Microsystems's Solaris, Apple Computer's MacOs, Linux or UNIX. In some embodiments, the computer system 500 can also include a Basic Input/Output System (BIOS) and processor firmware. The operating system, BIOS and firmware are used by the one or more processors 502 to control subsystems and interfaces coupled to the one or more processors 502. In some embodiments, the one or more processors 502 can include the Pentium and Itanium from Intel, the Opteron and Athlon from Advanced Micro Devices, and the ARM processor from ARM Holdings.

As illustrated in FIG. 5, the computer system 500 can include a machine-readable medium 504. In some embodiments, the machine-readable medium 504 can further include a main random-access memory ("RAM") 506, a read only memory ("ROM") 508, and/or a file storage subsystem 510. The RAM 530 can store instructions and data during program execution and the ROM 532 can store fixed instructions. The file storage subsystem 510 provides persistent storage for program and data files, and may include a hard disk drive, a floppy disk drive and associated removable media, a CD-ROM drive, an optical drive, a flash memory, or removable media cartridges.

The computer system 500 can further include user interface input devices 512 and user interface output devices 514. The user interface input devices 512 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 512 can be connected by wire or wirelessly to the computer system 500. Generally, the user interface input devices 512 are intended to include all possible types of devices and ways to input information into the computer system 500. The user interface input devices 512 typically allow a user to identify objects, icons, text and the like that appear on some types of user interface output devices, for example, a display subsystem. The user interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 520 are intended to include all possible types of devices and ways to output information from the computer system 500.

The computer system 500 can further include a network interface 516 to provide an interface to outside networks, including an interface to a communication network 518, and is coupled via the communication network 518 to corresponding interface devices in other computer systems or machines. The communication network 518 may comprise many interconnected computer systems, machines and communication links. These communication links may be wired links, optical links, wireless links, or any other devices for communication of information. The communication network 518 can be any suitable computer network, for example a wide area network such as the Internet, and/or a local area network such as Ethernet. The communication network 518 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 5, the one or more processors 502, the machine-readable medium 504, the user interface input devices 512, the user interface output devices 514, and/or the network interface 516 can be communicatively coupled to one another using a bus subsystem 520. Although the bus subsystem 520 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A model processing server for displaying an object onto a real-world structure, the model processing server comprising:
    a memory configured to store a three-dimensional model of the object in a three-dimensional space; and
    a processor configured to execute instructions stored in the memory, the instructions, when executed by the processor, configuring the processor to:
        access the three-dimensional model of the object stored in the memory;
        generate a three-dimensional reflection model of the object in the three-dimensional space,
        transform the three-dimensional reflection model of the object from the three-dimensional space to provide a two-dimensional reflection model of the object in a two-dimensional space, and
        provide the two-dimensional reflection model of the object in the two-dimensional space to the real-world structure to display the object.

2. The model processing server of claim 1, wherein the three-dimensional reflection model of the object represents one or more reflected duplications of the three-dimensional model of the object along one or more reflective surfaces in the three-dimensional space.

3. The model processing server of claim 2, wherein the instructions, when executed by the processor, further configure the processor to:
    position the three-dimensional model of the object within a three-dimensional reflecting volume having the one or more reflective surfaces; and
    capture the three-dimensional model of the object that is reflected onto the one or more reflective surfaces to construct the three-dimensional reflection model of the object from the three-dimensional model of the object in the three-dimensional space.

4. The model processing server of claim 3, wherein the instructions, when executed by the processor, further configure the processor to capture a reflected ray of light that was reflected by the one or more reflective surfaces after the reflected ray of light has passed through the three-dimensional reflection model of the object.

5. The model processing server of claim 4, wherein the instructions, when executed by the processor, further configure the processor to:
    position a virtual camera at a central focal point within the three-dimensional reflecting volume having the one or more reflective surfaces; and
    use the virtual camera to capture the reflected ray of light.

6. The model processing server of claim 1, wherein the instructions, when executed by the processor, configure the processor to mathematically transform one or more three-dimensional coordinates of the three-dimensional reflection model of the object in the three-dimensional space onto one or more two-dimensional coordinates of the two-dimensional reflection model of the object in the two-dimensional space.

7. The model processing server of claim 6, wherein the instructions, when executed by the processor, configure the processor to mathematically transform the one or more three-dimensional coordinates of the three-dimensional reflection model of the object onto the one or more two-dimensional coordinates of the two-dimensional reflection model of the object in accordance with an equirectangular projection function, an equidistant fisheye projection function, an equisolid fisheye projection function, a stereographic fisheye projection function, an equiangular cubemap projection function, or a latitude/longitude projection function.

8. The model processing server of claim 1, wherein the instructions, when executed by the processor, further configure the processor to provide the two-dimensional reflection model of the object in the two-dimensional space to the real-world structure to map the two-dimensional reflection model of the object in the two-dimensional space onto on a plurality of programmable picture elements that are spread across an exterior of the real-world structure to display the object across the exterior of the structure.

9. A method for displaying an object onto a real-world structure, the method comprising:
  accessing, by a model processing server, a three-dimensional model of the object in a three-dimensional space;
  generating, by the model processing server, a three-dimensional reflection model of the object in the three-dimensional space;
  transforming, by the model processing server, the three-dimensional reflection model of the object from the three-dimensional space to provide a two-dimensional reflection model of the object in a two-dimensional space; and
  providing the two-dimensional reflection model of the object in the two-dimensional space to the real-world structure to display the object.

10. The method of claim 9, wherein the three-dimensional reflection model of the object represents one or more reflected duplications of the three-dimensional model of the object along one or more reflective surfaces in the three-dimensional space.

11. The method of claim 10, wherein the generating comprises:
  positioning, by the model processing server, the three-dimensional model of the object within a three-dimensional reflecting volume having the one or more reflective surfaces; and
  capturing, by the model processing server, the three-dimensional model of the object that is reflected onto the one or more reflective surfaces to construct the three-dimensional reflection model of the object from the three-dimensional model of the object in the three-dimensional space.

12. The method of claim 11, wherein the capturing comprises:
  capturing a reflected ray of light that was reflected by the one or more reflective surfaces after the reflected ray of light has passed through the three-dimensional reflection model of the object.

13. The method of claim 12, wherein the capturing the reflected ray of light comprises:
  positioning a virtual camera at a central focal point within the three-dimensional reflecting volume having the one or more reflective surfaces; and
  using the virtual camera to capture the reflected ray of light.

14. The method of claim 9, wherein the transforming comprises mathematically transforming one or more three-dimensional coordinates of the three-dimensional reflection model of the object in the three-dimensional space onto one or more two-dimensional coordinates of the two-dimensional reflection model of the object in the two-dimensional space.

15. The method of claim 14, wherein the mathematically transforming comprises mathematically transforming the one or more three-dimensional coordinates of the three-dimensional reflection model of the object onto the one or more two-dimensional coordinates of the two-dimensional reflection model of the object in accordance with an equirectangular projection function, an equidistant fisheye projection function, an equisolid fisheye projection function, a stereographic fisheye projection function, an equiangular cubemap projection function, or a latitude/longitude projection function.

16. The method of claim 9, wherein the providing comprises providing the two-dimensional reflection model of the object in the two-dimensional space to the real-world structure to map the two-dimensional reflection model of the object in the two-dimensional space onto on a plurality of programmable picture elements that are spread across an exterior of the real-world structure to display the object across the exterior of the structure.

17. A system for displaying an object, the system comprising:
  a model processing server configured to:
    access a three-dimensional model of the object in a three-dimensional space,
    generate a three-dimensional reflection model of the object in the three-dimensional space, and
    transform the three-dimensional reflection model of the object from the three-dimensional space to provide a two-dimensional reflection model of the object in a two-dimensional space; and
  a structure having a plurality of programmable picture elements that are spread across an exterior of the structure, the structure being configured to map the two-dimensional reflection model of the object onto the plurality of programmable picture elements to display the object across the exterior of the structure.

18. The system of claim 17, wherein the three-dimensional reflection model of the object represents one or more reflected duplications of the three-dimensional model of the object along one or more reflective surfaces in the three-dimensional space.

19. The system of claim 18, wherein the model processing server is further configured to:
  position the three-dimensional model of the object within a three-dimensional reflecting volume having the one or more reflective surfaces; and
  capture the three-dimensional model of the object that is reflected onto the one or more reflective surfaces to construct the three-dimensional reflection model of the object from the three-dimensional model of the object in the three-dimensional space.

20. The system of claim 19, wherein the model processing server is further configured to capture a reflected ray of light that was reflected by the one or more reflective surfaces after the reflected ray of light has passed through the three-dimensional reflection model of the object.

21. The system of claim 17, wherein the model processing server is configured to mathematically transform one or more three-dimensional coordinates of the three-dimensional reflection model of the object in the three-dimensional space onto one or more two-dimensional coordinates of the two-dimensional reflection model of the object in the two-dimensional space in accordance with an equirectangular projection function, an equidistant fisheye projection function, an equisolid fisheye projection function, a stereographic fisheye projection function, an equiangular cubemap projection function, or a latitude/longitude projection function.

22. The system of claim 17, wherein the structure comprises a hemisphere structure.

* * * * *

UNITED STATES PATENT AND TRADEMARK OFFICE
CERTIFICATE OF CORRECTION

| | | |
|---|---|---|
| PATENT NO. | : 12,469,214 B2 | Page 1 of 1 |
| APPLICATION NO. | : 18/341464 | |
| DATED | : November 11, 2025 | |
| INVENTOR(S) | : Ward et al. | |

It is certified that error appears in the above-identified patent and that said Letters Patent is hereby corrected as shown below:

In the Claims

In Column 16, Claim 1, Line 2, delete "memory;" and insert -- memory, --, therefor.

Signed and Sealed this
Thirtieth Day of December, 2025

John A. Squires
*Director of the United States Patent and Trademark Office*